United States Patent [19]

Upson

[11] Patent Number: 5,185,911

[45] Date of Patent: Feb. 16, 1993

[54] APPARATUS AND METHOD FOR CONVERTING SIDE OPERATED MACHINE CONTROLS TO BE FRONT OPERATED

[76] Inventor: Warren S. Upson, 1635 Robinson Ave., San Diego, Calif. 92103

[21] Appl. No.: 874,376

[22] Filed: Apr. 27, 1992

[51] Int. Cl.[5] .................. B21K 21/16; B23P 19/04; B26B 5/24
[52] U.S. Cl. ................................. 29/401.1; 83/473; 83/477.1
[58] Field of Search ............... 29/401.1; 403/57, 58; 83/471.3, 473, 477, 477.1, 477.2; 144/130

[56] References Cited

U.S. PATENT DOCUMENTS

| | | | |
|---|---|---|---|
| 2,852,047 | 4/1956 | Oldum et al. | |
| 4,249,442 | 2/1981 | Fittery | |
| 4,270,427 | 6/1981 | Colberg et al. | |
| 4,276,799 | 7/1981 | Muehling | |
| 4,336,733 | 6/1982 | Macksoud | |
| 4,385,539 | 5/1983 | Meyerhoefer et al. | |
| 4,597,312 | 7/1986 | Hicks et al. | 29/401.1 X |
| 4,922,599 | 5/1990 | Durfee | 29/401.1 |
| 5,025,543 | 6/1991 | Byers et al. | 29/401.1 |
| 5,040,444 | 8/1991 | Shiotani et al. | |
| 5,138,756 | 8/1992 | Johnson et al. | 29/401.1 |

*Primary Examiner*—Timothy V. Eley
*Attorney, Agent, or Firm*—Thomas J. Tighe

[57] ABSTRACT

An apparatus for converting side operated controls of a machine to be front operated. A front control panel or apron is vertically mounted on the machine, preferably using preexisting mounting hardware. Any preexisting front operated controls and front indicators are translated forward to the front of the control panel by extending their control linkages through respective holes defined by the panel. The linkage of each side operated control is articulated and bent through an angle sufficient to redirect the linkage for frontal operation, and the control end of the redirected linkage is translated forward to the front of the panel by protruding through and just beyond the panel. The articulation and redirection is preferably accomplished by a plurality of universal joints and the translation can be accomplished by estension shafts or extension arms. The controls can also be modified to increase or create a mechanical advantage for an operator. The apparatus can be designed as a kit for retrofitting preexisting machines.

16 Claims, 2 Drawing Sheets

APPARATUS AND METHOD FOR CONVERTING SIDE OPERATED MACHINE CONTROLS TO BE FRONT OPERATED

BACKGROUND OF THE INVENTION

This invention relates in general to table-mounted machines, e.g. table saws, that have hand control means designed to be operated from a side of the machine, i.e., an aspect of the machine not generally facing a direction from which an operator normally runs the machine, and in particular to apparatuses for converting the control means to be operable from a front of the machine, i.e., an aspect of the machine that is facing a direction from which an operator normally runs the machine.

In many common table-mounted machines the work table can be rotated from a horizontal position, i.e. tilted, in order to machine a piece at a desired angle. A good example of such a table-mounted machine is a table-mounted disc saw, i.e. table saw. However many of these table-mounted machines have tilt controls that are both inconveniently located and awkward to operate. The means for controlling the inclination angle of the table are located underneath a cantilevered extension of the work table and set back from the front of the machine. The operator must reach back along the side of the machine and underneath the table to make inclination adjustments, and from that position the operator can only view the angle of tilt obliquely while he or she is adjusting it.

For an operator of a table saw wanting to set the table inclination angle by visually comparing the angle between a vertical saw blade and the table with an angle marked on a work piece, it is very awkward for the tilt control to be underneath a table extension and set back from the operator. Such an arrangement almost invariably requires that an operator make the adjustments piecemeal. The operator must go through several steps of adjusting the tilt and then comparing the angles to see if they match. Because the operator must bend over and reach back in order to adjust the tilt, it is difficult if not impossible for the operator to visually compare the angles and make adjustments to the inclination simultaneously.

Not all table-mounted machines, such as table saws, employ tilt controls that are located so inconveniently. There exist, however, a large number of machines that have their tilt controls inconveniently located, which would benefit from the invention described herein. An example of such a machine is a Craftsman 10-inch belt-driven table saw. In addition, table-mounted machines having awkward tilt controls are believed to continue to be manufactured, and would benefit from the use of the invention herein disclosed during the production of the tables.

SUMMARY OF THE INVENTION

An object of this invention is to substantially eliminate the inconvenience and inefficiency of those table-mounted machines that have one or more control means located on a side not facing an operator by providing a means for relocating said control means to a side facing the operator.

A further object of this invention is to substantially eliminate the inconvenience and inefficiency of those table-mounted power saws which have one or more control means located on a side not facing an operator by providing a means for relocating said control means to a side facing the operator.

A further object of this invention is to provide a means by which an operator of a table saw can squarely view the angle of the saw blade with respect to the table while simultaneously adjusting the inclination of the table.

A further object of this invention is to provide a means by which an operator of such a table saw can squarely view the angle of the table with the saw blade while simultaneously adjusting the table's angle of inclination, which represents a substantial improvement in efficiency over having to guess at the angle of the saw while reaching underneath the saw table to operate the angular adjustment.

A further object is to provide a means which can be assembled in a kit to retrofit a conventional table saw having at least one control means located on a side not facing an operator for relocating said control means to a side facing the operator.

Toward these ends, there is disclosed for a machine having a lateral control linkage with an end that communicates with a side control, an apparatus for making the side control operable from a front of the machine comprising means for redirecting the end of the lateral control linkage that communicates with the side control to make the lateral control linkage operable from a frontal direction, means for translating the redirected end of the lateral control linkage to the front of the machine, and means for holding the redirected and translated end of the lateral control linkage in place. There is also disclosed for a machine having a frontal control linkage with an end that communicates with a front control and a lateral control linkage having an end that communicates with a side control, an apparatus for making the side control operable from a front of the machine comprising a panel means affixed to the front of the machine, means for translating the end of the frontal control linkage that communicates with the front control to a front of the panel means, means for redirecting the end of the lateral control linkage that communicates with the side control to make the lateral control linkage operable from a frontal direction, means for translating the redirected end of the lateral control linkage to the front of the panel means, and means for holding the redirected and translated ends of the linkages in place. There is also disclosed a method for modifying an existing machine by use of these apparatuses.

DESCRIPTION OF THE PREFERRED EMBODIMENT

Figure 1:
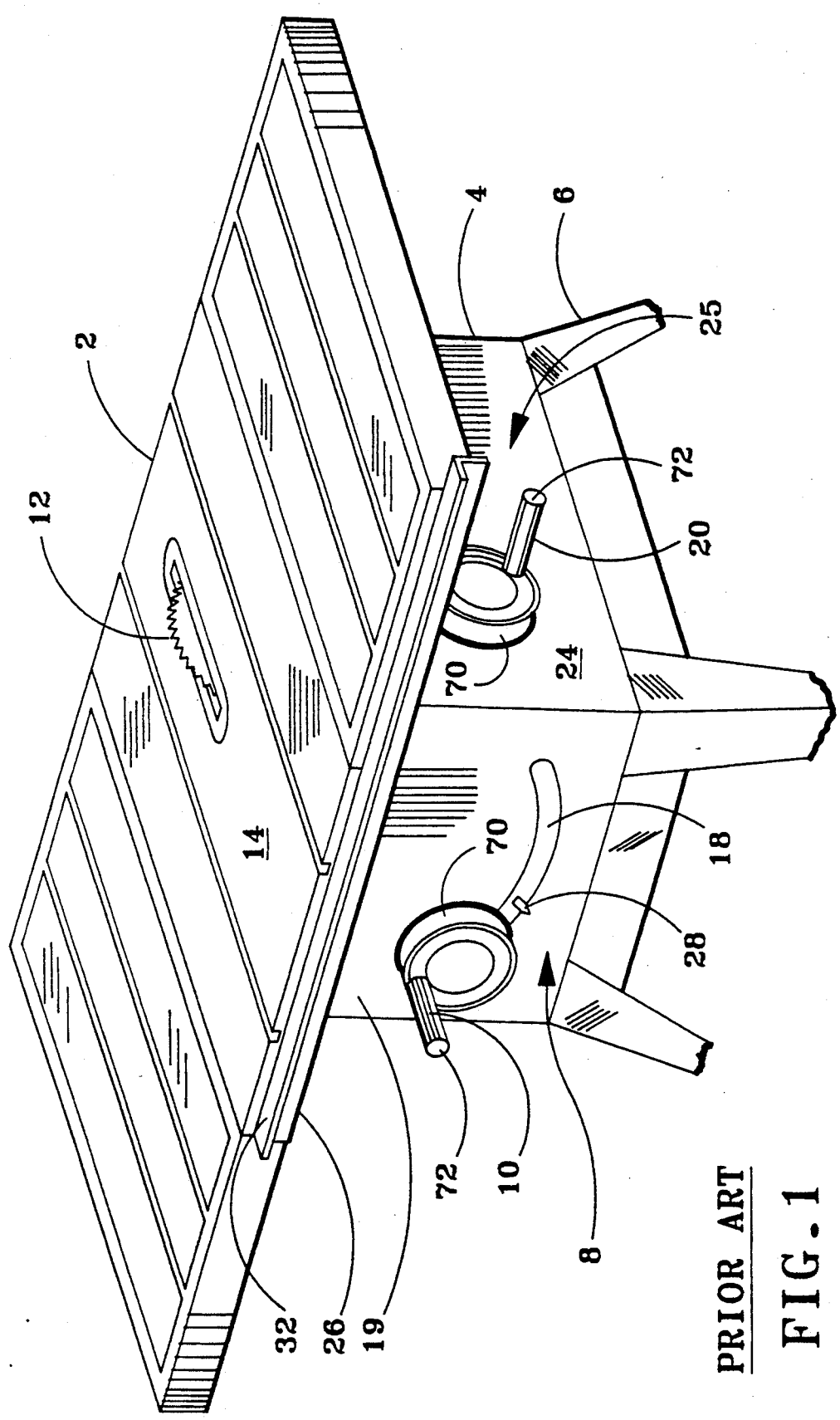
FIG. 1 is a perspective view of a conventional table saw with lateral table extensions and fence guide bars, a table saw configured similarly to the previously mentioned Craftsman 10-inch table saw, to which the improvement disclosed herein relates.

Referring now to FIG. 1, there is shown a specific model of a table-mounted machine of the type to which the present invention is addressed. In the following discussion, reference to a table saw may be made alternately with that of a table-mounted machine. It is to be understood that the table saw version alluded to is but one kind of a table-mounted machine to which the present invention may apply.

Referring again to FIG. 1, the table saw illustrated has a table top 2 beneath which is a machine housing 4, both of which are supported by legs 6. The machine housing contains the internal workings of the machine which can be conventional. The table saw has a "front" generally designated 8, for reference purposes, which is that aspect of the machine generally facing a direction from which an operator normally runs the machine. A front control of the machine is a hand-operated elevation control 10 for adjusting the elevation of a vertical saw blade 12 with respect to a table surface 14. The elevation control communicates mechanically with an end of an elevation control linkage which is the mechanical linkage between the elevation control and the conventional mechanism in the housing that actually adjusts the elevation. As illustrated, the elevation control linkage is a control shaft 16 (FIG. 2) that has a hand-operated end which extends outwardly through an arcuate slot 18 defined by a front panel 19 of the housing, and the means by which the linkage is hand operated, i.e., the elevation control 10, is a crank affixed at the free end of the control shaft. The elevation control linkage is a "frontal control linkage" in that its disposition and orientation is for communicating mechanical control information from generally the front 8 of the machine to its associated elevation mechanism inside the housing. Rotating the elevation crank vertically raises or lowers the saw blade in relation to the table surface depending on the direction of rotation.

Referring again to FIG. 1, the table can be laterally rotated, i.e. tilted, from the horizontal within a tilt range by means of a side control, i.e., a hand-operated tilt control 20. The tilt control communicates mechanically with an end of a tilt control linkage which is the mechanical linkage between the tilt control and the conventional mechanism in the housing that actually adjusts the tilt. As illustrated, the tilt control linkage is a control shaft 22 (FIG. 2) that has a hand-operated end which extends outwardly through an opening defined by a side panel 24 of the housing, and the means by which the linkage is hand operated, i.e., the tilt control 20, is a crank affixed at the free end of the control shaft. Rotating the tilt crank adjusts the angle the table surface makes with the horizontal over the tilt range. However the tilt control linkage is not a frontal control linkage, but rather a "lateral control linkage" in that its disposition and orientation is for communicating mechanical information from a side, generally designated 25, of the machine to its associated tilt mechanism inside the housing, the side being an aspect of the machine not generally facing a direction from which an operator normally runs the machine. Moreover the tilt crank is located under a lateral cantilevered extension 26 of the table. So in order to adjust the tilt of the table, an operator must reach under the table extension and back along the side in order to turn the tilt crank. This is very disadvantageous as previously discussed.

Referring again to FIG. 1, as the table is tilted, the elevation crank 10 travels in a corresponding arc along the arcuate slot 18. Also travelling in a corresponding arc along the arcuate slot is a tilt angle pointer 28. The pointer is used to indicate the angle of the table surface with the horizontal by pointing to angular graduations (not shown) along a margin of the arcuate slot, travels with the table as it is set to various angles of tilt, for all of the achievable angles of inclination.

Figure 2:
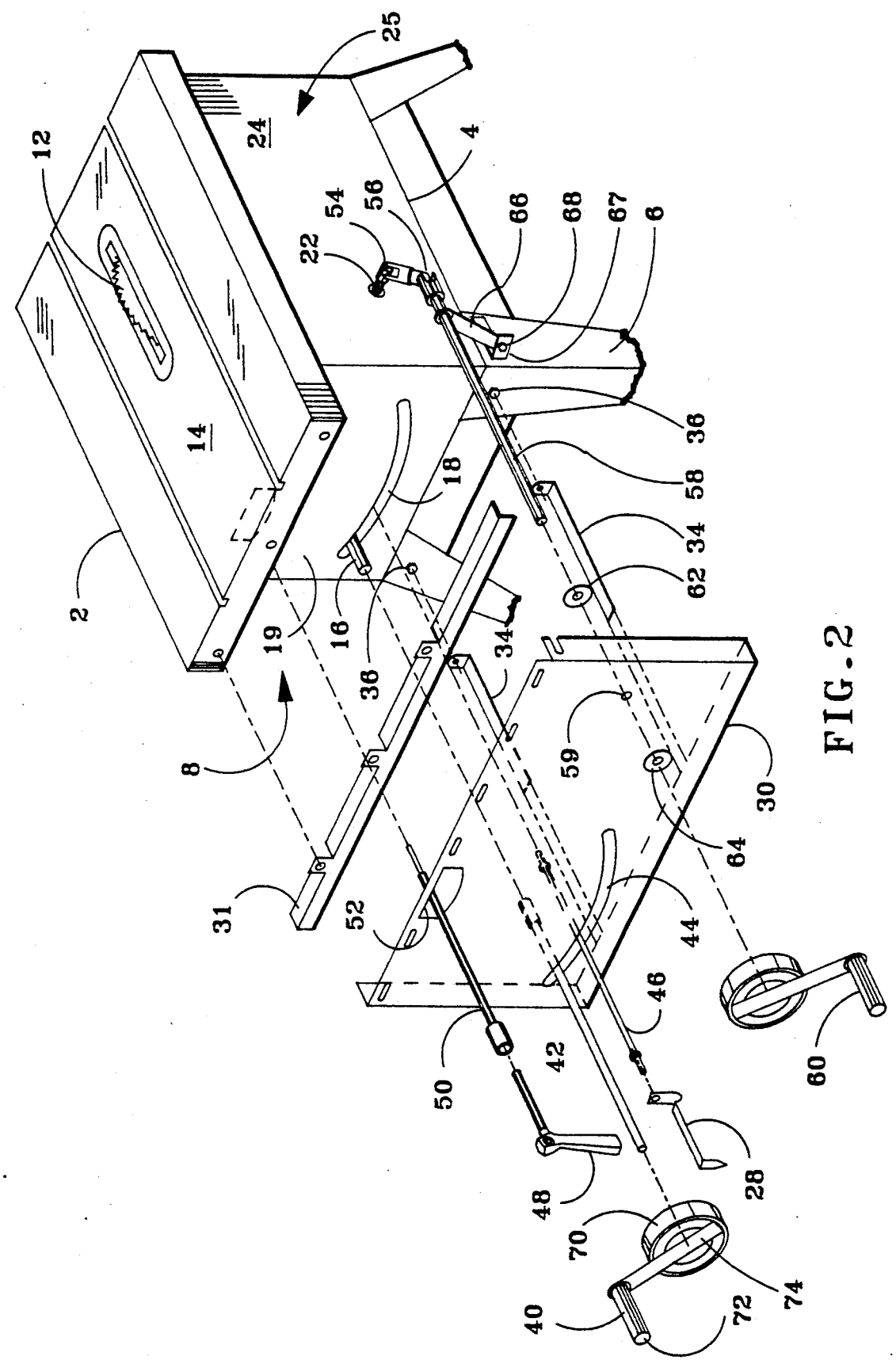
FIG. 2 is an exploded view of the table saw of FIG. 1 (with the lateral table extensions and fence guide bars removed only for clarity of disclosure) as improved according to this invention.

Referring to FIG. 2, the table saw of FIG. 1 has been modified according to this invention. A vertical, preferably sheet metal, apron 30 has been affixed to a front edge of the table. Preferably the top margin of the apron is affixed to an elongated bracket 31 which in turn is affixed to the front table edge by bolting onto the protruding ends of bolts in bolt holes used for holding the fence guide bar 32 (FIG. 1). Thus, the apron can be attached with or without a fence guide bar in place. Since the table overhangs the housing in front, the apron is spaced from the front panel 19 of the housing, and the bottom of the apron is horizontally stabilized by two support brackets 34, each of which is affixed (as by bolting or welding) to a bottom margin of the apron. Each support bracket attaches to the machine by means of a closest preexisting leg bolt 36 on the front side of the table saw. The height of the apron generally matches the front panel 19 of the housing.

Referring again to FIG. 2, the elevation and tilt cranks, 10 and 20, have each been replaced by a crank designed to provide more mechanical advantage to an operator as will be further explained. Adding mechanical advantage to the cranks compensates for any such advantage lost due to the control changes described herein. The new elevation crank 40 is coupled to an end of an elevation control extension shaft 42 which extends through an arcuate slot 44 defined by the apron and which couples to the elevation control shaft 16. The added elevation control extension shaft provides a torque link between the new elevation crank and the preexisting elevation control shaft. In this fashion, the control end of the elevation linkage is translated forward to just beyond the apron making the elevation control readily accessible to an operator positioned in front of the apron. The arcuate slot 44 in the apron can match the arcuate slot 18 of the front panel 19 in form and size and is basically a scale projection of the front panel upon the apron.

Referring again to FIG. 2, the pointer 28 is also translated to a certain point beyond the apron through the arcuate slot by means of a pointer extension arm 46. Moreover, angular graduations (not shown) along a margin of the apron's arcuate slot correspond to the angular graduations (not shown) along a corresponding margin of the front panel's arcuate slot. The added extension arm rigidly links the preexisting pointer with its preexisting drive mechanism inside the housing such that the pointer travels along the angular graduations on the apron the same as it had traveled along the angular graduations on the front panel.

Referring again to FIG. 2, a tilt locking control 48 in the form of a lever used by an operator to lock a table angle in place is also translated forward beyond the apron. A tilt locking control extension shaft 50 provides a torque link between the preexisting lever and the preexisting tilt locking mechanism in the housing. The tilt locking control extension shaft extends through an opening 52 defined by the apron which corresponds to a similar opening in the front panel of the housing. In this fashion, the tilt locking control is translated to be operable by a person positioned at the apron.

Referring again to FIG. 2, the tilt control linkage has been externally articulated so that it is redirected toward the front of the machine and the control end of linkage has been translated forward to a point where it is a frontal control linkage. The redirection and translation of the tilt control linkage is accomplished preferably by a pair of coupled universal joints, 54 and 56, and an extension shaft. A first universal joint is connected to the preexisting tilt control shaft 22 and the second universal joint is connected to one end of a tilt control extension shaft 58. As illustrated each universal joint accomplishes approximately 45 degrees of a 90 degree joint in the linkage, and so the tilt control extension shaft points frontward and is long enough to extend through an opening 59 defined by the apron. The new tilt crank 60 is affixed at the free end of the tilt control extension shaft just beyond the apron. The universal joints are each held at their proper angles by means of a pair of collars, 62 and 64, affixed to the tilt control extension shaft which in combination fix the tilt control extension shaft in relation to the apron, and a support bar 66. One of the collars 62 is disposed flush against the inboard side of the apron at the opening 59 through which the shaft extends, and the other collar 64 is disposed flush against the outboard side of the apron. The support bar 66 has one end affixed to the housing by a bracket 67 and the tilt control extension shaft extends unbindingly through an opening defined by the other end of the support bar. There is a pivotal connection 68 between the support bar and the bracket, which connection can be tightened to hold them in fixed relation. In this fashion, the support bar and apron hold the tilt control extension shaft in place both vertically and laterally, and the collars on either side of the apron hold the tilt control extension shaft in place longitudinally, while they all allow the extension shaft to turn freely.

Referring again to FIGS. 1 and 2, the new elevation and tilt control cranks, 40 and 60, can be the preexisting cranks, 10 and 20 respectively, reworked. As illustrated, each preexisting crank is a wheel 70 with a perpendicular hand grip 72 affixed to the margin of the wheel. The distance from the center of the wheel to the handgrip, i.e., the radius of the wheel, provides a certain amount of mechanical advantage to an operator. To rework each preexisting crank to provide more mechanical advantage, the handgrip can be removed, a metal bar 74 can be affixed across the wheel through the center, and the handgrip affixed to the free end of the bar. The bar can be affixed to the wheel preferably by welding or bolting. In this fashion, the distance between the handgrip and the center of the wheel is increased to provide the increased mechanical advantage.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. In a machine having a lateral control linkage with an end that communicates with a side control, an apparatus for making the side control operable from a front of the machine comprising:
  (a) means for redirecting the end of the lateral control linkage that communicates with the side control to make the lateral control linkage operable from a frontal direction,
  (b) means for translating the redirected end of the lateral control linkage to the front of the machine, and
  (c) means for holding the redirected and translated end of the lateral control linkage in place.

2. The apparatus according to claim 1 wherein the means for redirecting the end of the lateral control linkage comprises means for articulating the lateral control linkage and bending it through an angle sufficient to make said linkage operable from a frontal direction.

3. The apparatus according to claim 2 wherein the lateral control linkage comprises a rotatable shaft and the means for articulating and bending the lateral control linkage comprises a plurality of universal joints connected serially to said rotatable shaft.

4. The apparatus according to claim 3 wherein the means for translating the redirected end of the lateral control linkage comprises an extension shaft connected serially to the plurality of universal joints.

5. The apparatus according to claim 4 wherein the means for holding the redirected and translated lateral control linkage in place comprises means for holding the extension shaft in place both vertically and laterally, and means for holding the extension shaft in place longitudinally.

6. The apparatus according to claim 1 further comprising means for increasing a mechanical advantage of the side control.

7. In a machine having a frontal control linkage with an end that communicates with a front control and a lateral control linkage having an end that communicates with a side control, an apparatus for making the side control operable from a front of the machine comprising:
  (a) a panel means affixed to the front of the machine,
  (b) means for translating the end of the frontal control linkage that communicates with the front control to a front of the panel means,
  (c) means for redirecting the end of the lateral control linkage that communicates with the side control to make the lateral control linkage operable from a frontal direction,
  (d) means for translating the redirected end of the lateral control linkage to the front of the panel means, and
  (e) means for holding the redirected and translated ends of the linkages in place.

8. The apparatus according to claim 7 wherein the means for redirecting the end of the lateral control linkage comprises means for articulating the lateral control linkage and bending it through an angle sufficient to make said linkage operable from a frontal direction.

9. The apparatus according to claim 8 wherein the lateral control linkage comprises a rotatable shaft and the means for articulating and bending the lateral control linkage comprises a plurality of universal joints connected serially to said rotatable shaft.

10. The apparatus according to claim 9 wherein the means for translating the redirected end of the lateral control linkage comprises an extension shaft connected serially to the plurality of universal joints.

11. The apparatus according to claim 10 wherein the means for holding the redirected and translated lateral control linkage in place comprises means for holding the extension shaft in place both vertically and laterally, and means for holding the extension shaft in place longitudinally.

12. The apparatus according to claim 7 further comprising means for increasing a mechanical advantage of the side control.

13. The apparatus according to claim 7 further comprising means for increasing a mechanical advantage of the front control.

14. The apparatus according to claim 7 further comprising means for translating an indicating means originally disposed on a front of the machine to the front of the panel means.

15. In a machine having a lateral control linkage with an end that communicates with a side control, a method for making the side control operable from a front of the machine comprising the steps:

(a) removing the side control from the end of the lateral control linkage, (b) redirecting the end of the lateral control linkage that communicated with the side control to make the lateral control linkage operable from a frontal direction, (c) translating the redirected end of the lateral control linkage to the front of the machine, (d) securing the redirected and translated end of the lateral control linkage in place, and (e) attaching the side control to the redirected and translated end of the lateral control linkage.

16. The method according to claim 15 further comprising the step of modifying the side control to increase a mechanical advantage for an operator.

* * * * *